Figure 1:
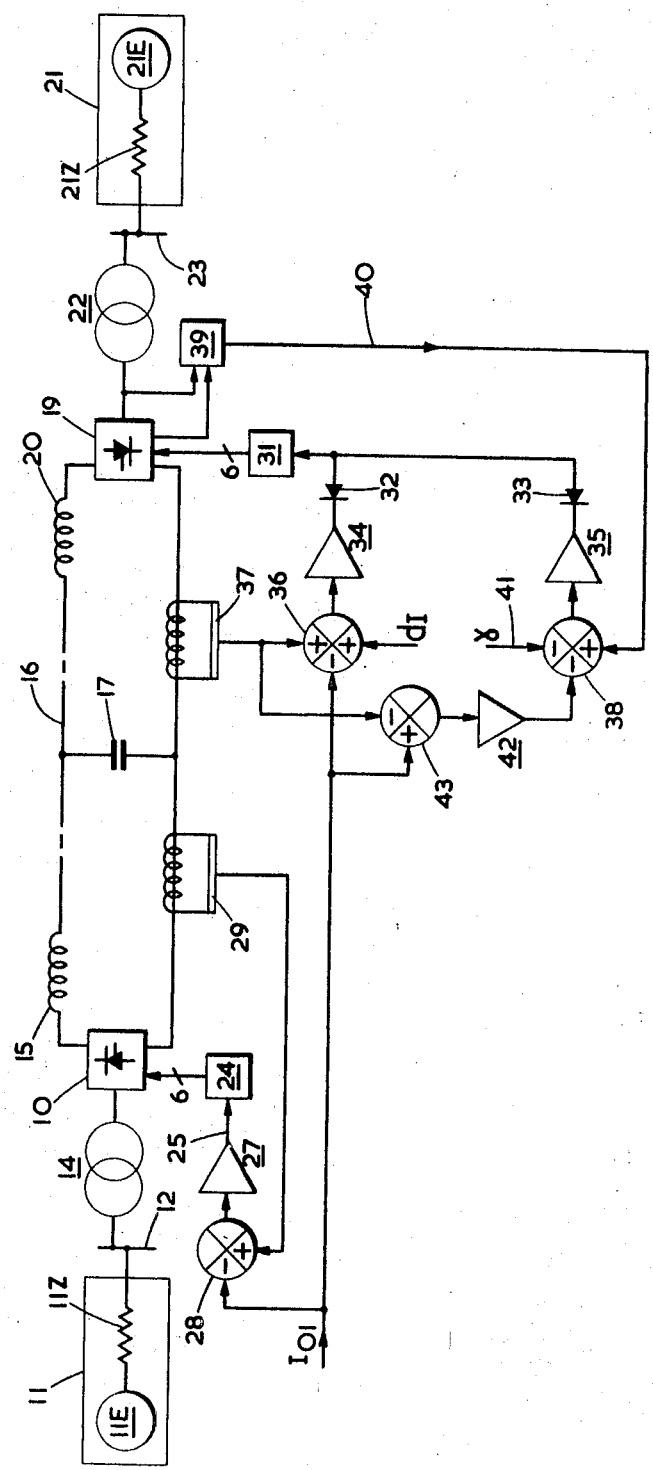

United States Patent
Ainsworth

[15] 3,644,820
[45] Feb. 22, 1972

[54] CONTROL CIRCUITS FOR INVERTERS
[72] Inventor: John Desmond Ainsworth, Stafford, England
[73] Assignee: The English Electric Company, Limited, London, England
[22] Filed: May 11, 1970
[21] Appl. No.: 36,155

[30] Foreign Application Priority Data
May 9, 1969 Great Britain......................23,662/69

[52] U.S. Cl............................321/52, 321/2, 321/19
[51] Int. Cl........................................H02m 5/14
[58] Field of Search...............321/4, 2, 16, 18, 19, 40, 52

[56] References Cited
UNITED STATES PATENTS

| | | | |
|---|---|---|---|
| 3,465,234 | 9/1969 | Phadke | 321/18 X |
| 2,419,466 | 4/1947 | Willis | 321/4 |
| 3,388,310 | 6/1968 | Etter | 321/16 X |
| 3,413,538 | 11/1968 | Hodges | 321/2 |
| 3,424,971 | 1/1969 | Stackegard | 321/18 |
| 3,447,063 | 5/1969 | Hammarlund | 321/18 X |
| 3,467,848 | 9/1969 | Ainsworth | 321/16 X |
| 3,536,985 | 10/1970 | Ekstrom | 321/18 X |

Primary Examiner—William M. Shoop, Jr.
Attorney—Misegades and Douglas

[57] ABSTRACT

In the transmission of direct current from a rectifier to an inverter one method of control has been to provide a constant current at the rectifier and a constant extinction angle at the inverter controlled by a fixed extinction angle order signal. Instability results with this form of control under certain operating conditions. In the present invention the tendency to instability is reduced by controlling the extinction angle of the inverter in accordance with the fixed order signal when the inverter output current is at least equal to a required level, but increasing the extinction angle when the inverter current is less than the required level. The extinction angle is increased under the control of an auxiliary order signal generated by a summing unit which sums a signal from a control circuit representing the actual extinction angle, the fixed order signal, and a signal from an amplifier dependent on the difference between the actual and required current levels.

6 Claims, 3 Drawing Figures

3,644,820

CONTROL CIRCUITS FOR INVERTERS

This invention relates to control circuits for controlling static inverters and more particularly relates to such circuits for controlling inverters in high-voltage direct current transmission systems.

According to one feature of the invention, there is provided a control circuit for controlling a static inverter, including control means for controlling the extinction angle of the inverter at a fixed predetermined value in accordance with a first extinction angle order signal when the level of output current from the invertor is at least as great as a predetermined level, and means for applying to said control means a second extinction angle order signal to cause said control means to increase the extinction angle when the output current level is less than said predetermined level.

When transmitting direct current from a rectifier to an inverter one method of controlling the transmission link has been to control, inter alia, the extinction angle of the inverter, or more particularly the valves of the inverter, to a nominally constant angle. Under certain operating conditions it has been found that a form of steady state instability may be set up in the link, and it is an object of the present invention to alleviate or overcome this problem.

Figure 2:
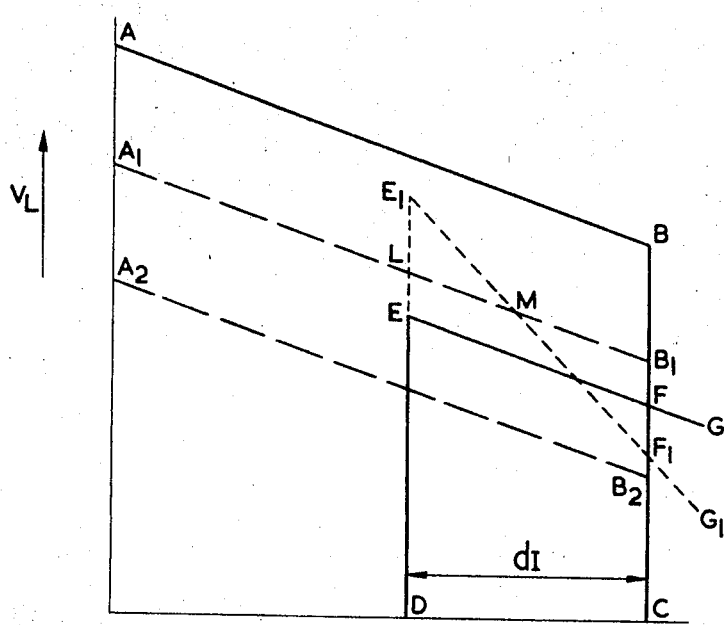
Figure 3:
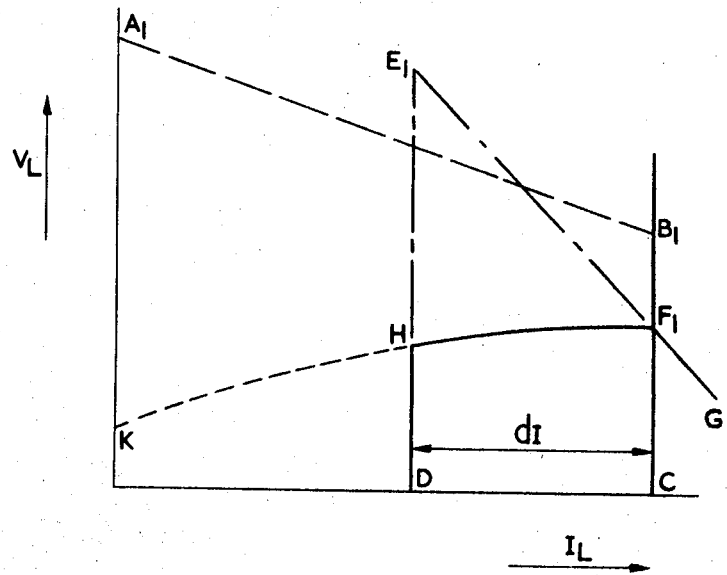

One embodiment of the invention will now be described, by way of example, with reference to the accompanying drawings, in which:

FIG. 1 is a schematic diagram of a simplified high voltage direct current transmission system, FIG. 2 shows the normal DC voltage/DC current characteristics for the rectifier and inverter shown in FIG. 1, and FIG. 3 shows the DC voltage/DC current characteristics for the rectifier and invertor in the system when the characteristic of the invertor is modified by the control circuit of FIG. 1.

Referring now to the drawings, in FIG. 1 a high voltage direct current link is shown to include a rectifier 10 supplied from an AC supply 11 via busbar 12 and transformer 14. The supply 11 is depicted as an alternating voltage source 11E connected in series with an impedance 11Z. The output from the rectifier 10 is applied via a smoothing inductor 15 to a DC transmission line 16, the impedance of this line being represented by a capacitor 17.

An inverter 19 is supplied with direct current from the transmission line 16, via another smoothing inductor 20, and, in turn, the inverter supplies an AC load 21 (represented by a voltage source 21E and impedance 21Z connected in series) via a transformer 22 and busbar 23.

The application of firing pulses to rectifier 10 is controlled by a firing pulse generator 24. The angle at which these pulses are applied to the rectifier valves is varied in dependence on a voltage signal on lead 25 representative of the difference between the desired rectifier DC current and the measured transmission line current. If, for example, the desired current is greater than the measured line current the firing angle is progressively decreased until these current values are substantially the same. This voltage signal is produced by an amplifier 27 the input to which is constituted by an error signal derived from a summing unit 28. The two inputs summed in the sense shown are firstly a fixed signal $I_{o1}$ indicative of the desired DC current to be produced by the rectifier and secondly a signal derived from a line transformer 29 indicative of the actual transmission line current.

The invertor 19 is similarly supplied with firing pulses from a pulse generator 31. The angle at which firing pulses are applied to the valves in the inverter 19 is varied in dependence on one or other of two signals fed to a firing pulse generator 31 via a pair of diodes 32 and 33 as discussed below. These two signals are applied from amplifiers 34 and 35 connected respectively to the diodes 32 and 33. Amplifier 34 is supplied with a signal from a summing unit 36 to which are fed the "desired" current signal $I_{o1}$, a constant current input signal $dI$, and a signal proportional to the transmission line current at the inverter, this last signal being provided by a transformer 37 as shown. These three signals are summed in the sense indicated to provide an error signal indicating the amount by which the transmission line current at the invertor differs from the desired DC current produced by the rectifier.

The signal $dI$ fed to amplifier 34 provides a constant current signal which matches the characteristic of the inverter to that of the rectifier, as will be described more fully below.

Amplifier 35 is supplied with a signal from a summing unit 38, which has three inputs. The first input to unit 38 is from an "extinction angle" control circuit 39 which provides on lead 40 a signal indicating the angle at which the valves of the invertor cease to conduct (this control circuit may conveniently be of the type described in our U.S. Pat. No. 3,474,321). The second input is an order signal, on lead 41, representing a preset desired extinction angle $\gamma$, for example 18°, of the valves of the invertor. The third input is taken from an amplifier 42 which produces a modified error signal dependent on the difference between the desired rectifier DC current signal $I_{o1}$ and the line current at the inverter as measured by transformer 37.

Amplifier 35 therefore produces a control signal dependent upon the extinction angle of the valves in invertor 19, and amplifier 34 produces a similar signal dependent upon the relative magnitudes of the desired and actual DC line currents. Whichever of these two amplifiers produces the more negative signal has effective control of the pulse generator 31 as, in the arrangement shown, only one of diodes 32 and 33 can conduct if the two signals from amplifiers 34 and 35 are at different voltage levels at any one time the extinction angle of the inverter valves is dependent upon, inter alia, the timing of the firing pulses from the unit 31. The extinction angle is therefore controlled by the loop including the circuit 39, the amplifier 35 and the generator 31, or by the amplifier 34 and the generator 31, depending upon the current level.

Referring now to FIG. 2 there are shown the normal characteristics of the rectifier 10 and invertor 19 plotted against the transmission line DC voltage ($V_L$) and DC current ($I_L$). Curves ABC and DEFG represent respectively the rectifier and inverter characteristics. The vertical portion BC of curve ABC corresponds to the condition when the actual transmission line current is substantially equal to the valve desired (represented by signal $I_{o1}$), and the portion AB follows the natural characteristics of the rectifier, when the firing angle $\alpha$ is zero, over the region where the rectifier DC current is less than the desired line DC current. When the transmission line current is less than the desired current from the rectifier, amplifier 27 tends to saturate and the limiting action of the converter system causes operation when the firing angle is zero.

The vertical portion DE of the inverter characteristic similarly corresponds to the condition where the desired inverter current, equal to the desired transmission line current $I_{o1}$ less $dI$, is equal to the actual inverter current with amplifier 34 controlling pulse generator 31. When the line current is greater than that desired, amplifier 35 is operative and the characteristic of the inverter follows EFG for a nominal extinction angle equal to, for example, 18°.

The length of the vertical positions of the two curves BC and DE depend upon the respective AC system voltages at the input and output of the link, for example, if the rectifier AC voltage supply should fall, the length of BC will decrease and the line AB will gradually fall through the two positions $A_1B_1$ and $A_2B_2$, shown dotted, as the rectifier AC voltage $vr$ falls from the initial value $vr0$ through $vr1$ to $vr2$.

The slopes of the portions AB and EG depend to a large extent on the respective AC system impedances 11Z and 21Z. The dotted line $EE_1 F_1G_1$ in FIG. 2 shows, for example, the effect of increasing the impedance 21Z from that originally shown in FIG. 1.

It will be seen that if the rectifier AC voltage is at $vr0$ there will be only one crossover point between the two characteristics, at F, and that the system will operate in a stable condition. However, if the rectifier AC voltage has fallen, for example, to the level $vr1$, there are now three crossover points between the two characteristics at L, M and $F_1$. Considerations of the system show that although it could not work if operated at position M there are still two quasistable states at which the system can work, namely L and $F_1$. Providing the positions are approached carefully it is possible to operate the system at either one of these points but any subsequent disturbance, for example a momentary loss of commutation, will cause the system to jump continuously between L and $F_1$ at a rate dependent on the time constant of the link.

This undesirable effect is overcome by the action of amplifier 42; which is supplied with a net signal proportional to the difference between the desired rectifier DC current $I_o$, and the actual DC line current IL, from a summing unit 43. This amplifier has a preset gain and the output from it is fed to the "extinction angle" control amplifier 35 in such a manner as to tend to increase the ordered extinction angle signal $\gamma$ as the line current falls below that which is desired. In addition the amplifier 42 is provided with inherent saturation limits such that its output voltage is restricted from zero to some fixed positive voltage. Thus, when the line current is equal to or greater than that desired, the output from this amplifier is zero and the extinction angle control circuit is not affected by it; when the line current falls below the desired line current a progressively increased extinction angle is ordered by the combination of amplifier 42 and the extinction angle order voltage supplied, as described before.

The characteristic of the inverter is thus modified and assumes the shape of the curve shown in FIG. 3 in which the complete inverter characteristic follows line $DHF_1G$.

It will be clear from the Figure that in the event of alterations in AC system voltages, for example in the AC supply voltage which would cause a change in the length of line BC, there will now only be on crossover point between the two characteristics at all times, therefore stable operation is always possible. The conditions required for this state are that the gain of amplifier 42 shall be sufficiently great to bring the inverter characteristic from the initial position $E_1F_1$ to a position such as $HF_1$ or a position with H even lower on the line E,D to ensure stability. The curve $HF_1$ then has a slope sufficiently great to ensure that any point along $HF_1$ is lower than AB for conditions corresponding to the lowest expected rectifier impedance 11Z and highest expected load impedance 21Z. The slope of this line may be made even greater to ensure stability.

Operation would not normally be in the region KH but it may occur in the even of a system fault when, for example, the signal $I_{o1}$ represented to the inverter is substantially below that presented to the rectifier. To prevent the inverter reversing operation and acting as a rectifier it is preferable to limit the gain so that the point K corresponds to a value of inverter commutation angle of not less than about 120°. If the slope of the line $HK_1$ is great, the upper limit positive saturation voltage of amplifier is chosen to limit the inverter commutation angle to an angle of not less than about 120°. This will act as a secondary protection in cases with a low slope as shown in FIG. 3.

I claim:

1. A control circuit for controlling a static invertor, including control means for controlling the extinction angle of the invertor at a fixed predetermined value in accordance with a first extinction angle order signal when the level of output current from the invertor is at least as great as a predetermined level, and means for applying to said control means a second extinction angle order signal to cause said control means to increase the extinction angle when the output current level is less than said predetermined level.

2. A circuit as claimed in claim 1, in which the means for applying a second signal includes means for summing said first signal with a third signal representing the actual extinction angle of the inverter and with a fourth signal derived from comparison of the inverter output current level with said predetermined output current level.

3. A circuit as claimed in claim 1, including means to generate a fifth signal representing the difference between said inverter output current level and said predetermined current level, and gating means for selectively gating said second and fifth signals to the control means.

4. A circuit as claimed in claim 3, arranged for use in a DC link in which the inverter is fed by rectifying apparatus, in which circuit said means for generating said fifth signal summates a signal representing a required rectifier output current, a signal representing the inverter output current level, and a current correction signal depending upon the difference between the rectifier and inverter characteristics.

5. A circuit as claimed in claim 1, in which said second extinction angle order signal is substantially proportional to the difference between the inverter output current level and said predetermined level.

6. A high-voltage DC transmission system including a control circuit as claimed in claim 1.

* * * * *